United States Patent [19]

Lewis

[11] Patent Number: 4,593,292

[45] Date of Patent: Jun. 3, 1986

[54] INK JET APPARATUS AND METHOD OF OPERATING INK JET APPARATUS EMPLOYING PHASE CHANGE INK MELTED AS NEEDED

[75] Inventor: Arthur M. Lewis, Ridgefield, Conn.

[73] Assignee: Exxon Research and Engineering Co., Florham Park, N.J.

[21] Appl. No.: 660,655

[22] Filed: Oct. 15, 1984

[51] Int. Cl.$^4$ ........................ G01D 9/00; G01D 15/16

[52] U.S. Cl. ................................ 346/1.1; 346/140 R

[58] Field of Search ................ 346/1.1, 140 R, 140 IJ, 346/140 PD, 76 PH; 400/120, 126; 106/30, 31

[56] References Cited

U.S. PATENT DOCUMENTS 3,653,932 4/1972 Berry et al. .............. 346/140 PD X
4,390,369 6/1983 Merritt et al. ........................ 106/31
4,462,035 7/1984 Koto .............................. 346/76 PH
4,490,731 12/1984 Vaught ......................... 346/140 PD

FOREIGN PATENT DOCUMENTS 0097823 1/1984 European Pat. Off. .

*Primary Examiner*—E. A. Goldberg
*Assistant Examiner*—Mark Reinhart

[57] ABSTRACT

A block of solid state ink is sequentially melted on demand as it is advanced against a heater plate. Sequentially melted ink flows into a continuously heated reservoir which supplies one or more ink jets.

23 Claims, 4 Drawing Figures

INK JET APPARATUS AND METHOD OF OPERATING INK JET APPARATUS EMPLOYING PHASE CHANGE INK MELTED AS NEEDED

BACKGROUND OF THE INVENTION

This invention relates to an ink jet wherein the ink employed within the jet is of the phase change type which may be referred to as hot melt ink.

A phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984. The hot melt ink may be jetted from a variety of apparatus including those disclosed in the aforesaid copending application.

When employing ink in a liquid state, the delivery of the ink is, of course, dictated by the liquid state. Typically, the ink is contained within a closed vesel of some sort prior to delivery to the ink jet. When employing hot melt ink, the delivery of the ink requires different solutions in order to provide a reliable supply and minimize operator intervention. At the same time, it is undesirable to heat an entire supply of hot melt ink at all times since the extended cooking of the hot melt ink may result in degradation of the ink.

SUMMARY OF THE INVENTION

It is an object of this invention to provide a hot melt ink delivery system wherein operator handling of the ink is minimized.

It is a further object of this invention to provide a hot melt ink delivery system wherein the ink may be reliably supplied to the ink jet apparatus.

It is a still further object of this invention to minimize the degradation of the ink by heating.

In accordance with another object of this invention, the amount of power needed to heat an ink supply is minimized.

In accordance with another object of this invention, there is no necessity for a large spill-proof ink reservoir.

In accordance with these and other objects of the invention, a monolithic block of ink in solid state form is heated to the melting point and the melted ink is supplied to a reservoir. Heating is then terminated while the ink within the reservoir is jetted. The foregoing steps are repeated as ink is required.

In accordance with this invention, the block of ink in solid state form may be advanced to a heater area. Preferably, the ink is maintained in contact with a heater surface and advancement of the ink may be under the control of spring biasing.

In accordance with another important aspect of the invention, the supply of liquid ink in the reservoir is detected and heating of the block of ink is initiated and terminated on demand in response to the detection of the supply of ink in the reservoir. Each heating of the block of ink may extend a predetermined period of time.

In accordance with another aspect of the invention, the ink jet supplied from the reservoir as well as the reservoir itself are moved in unison in a scanning motion.

DETAILED DESCRIPTION OF THE PREFERRED EMBODIMENT

Figure 1:
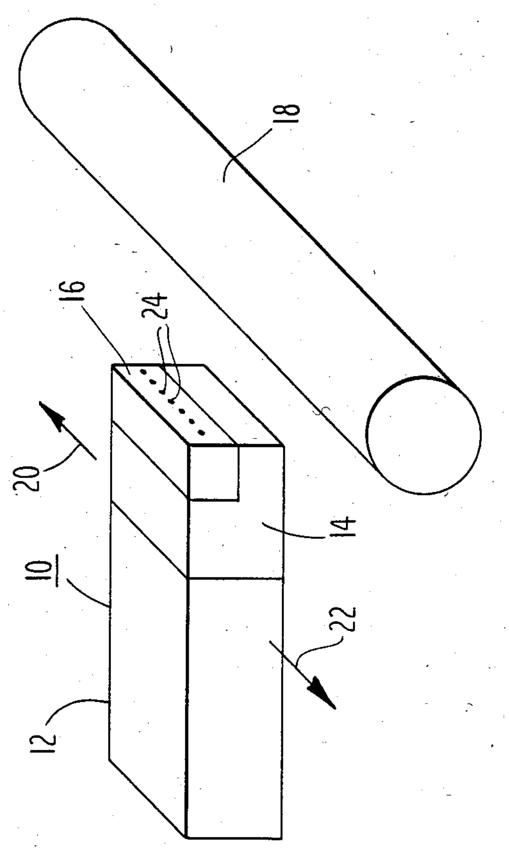
FIG. 1 is a perspective view of an ink jet apparatus embodying the invention.

Referring to FIG. 1, an ink jet scanning head 10 includes an ink supply section 12 coupled to a reservoir 14 and an ink jet imaging head 16. The imaging head 16 is juxtaposed to a platen 18 or other support for a print receiving medium. The entire scanning head 10 is scanned in unison as depicted by arrows 20 and 22 so as to permit droplets of ink ejected from orifices 24 to land upon the print receiving medium carried by the platen 18.

Figure 2:
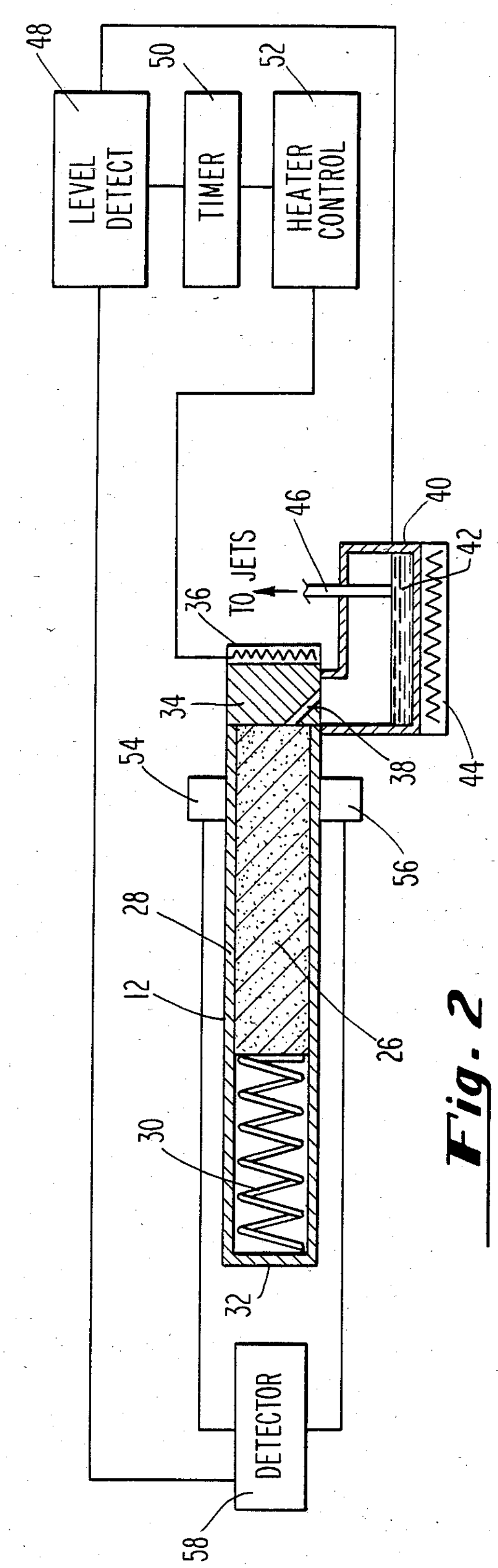
FIG. 2 is schematic representation of a portion of the apparatus shown in FIG. 1.

Referring now to FIG. 2, the ink supply 12 comprises an elongated, cylindrical block 26 of ink in solid state form which is contained within a cylindrical tube 28. The block 26 is spring biased by a coiled spring 30 located at one end 32 of the tube 28. The spring biasing of the block 26 forces the block 26 against a heated plate 34 which is coupled to a resistive heater 36. As the plate 34 is heated on demand, ink of the block 26 adjacent the plate 34 is free to flow through a channel 38 into a reservoir 40. As shown in FIG. 2, a supply of ink 42 is presently located within the reservoir 40 having been melted down from the end of the block 26. In order to maintain the ink 42 in a liquid state, a resistive heater 44 is located at the base of the reservoir 40. The ink 42 is supplied to the imaging head 16 shown in FIG. 1 through a fill tube 46 which communicates with the bottom of the reservoir 40.

In accordance with this invention, the block of ink 26 is under continuous pressure to advance to the heated plate 34. As the ink at the end of the block 26 adjacent the plate 34 is melted down, the biasing of the spring 30 urges the block 26 toward the plate 34. In other words, the block 26 is sequentially advanced on demand so as to assure that one end of the block 26 is always adjacent the plate 34 so as to permit coupling of the ink through the channel 38 into the reservoir 40.

In accordance with another aspect of the invention, the heater 36 is energized over predetermined periods of time in response to the level of the ink 42 in the reservoir 40. In this connection, an input 46 is provided from the reservoir 40 to a level detect circuit 48. When the level of the ink 42 within the reservoir 40 is sufficiently low, the level detect circuit 48 will energize a timer 50 which in turn signals a heater control 52 to initiate heating at the heater 36. After a predetermined length of time as determined by the timer 50, the timer 50 will signal the heater control 52 to turn off the heater 36. Thus the duration of each sequential heating by the heater 36 of the block 26 is timed.

In accordance with another aspect of the invention, the amount of ink in solid state form in the block 26 is detected. This detection of the amount of ink in the block 26 may be accomplished by a light source 54 coupled to a light detector 56. When the detector 56 detects the presence of light, a detector circuit 58 will inhibit the level detect circuit 48 so as to, in turn, inhibit heating of the plate 34 in response to the timer 50 in the absence of a sufficient quantity of ink in the form of block 26. The absence of ink may also be detected by a microswitch actuator.

It will therefore be appreciated that only a limited amount of ink 42 is maintained in a liquid state and that ink is consumed in relatively short order so as to prevent extended cooking of the ink. In this connection, it will be appreciated that the appropriate temperature regulation for the heater 44 as well as the heater 36 is necessary so as to assure the maintenance of proper temperatures. It will also be appreciated that various level detect sensors 46 may be utilized including optical, RF, thermocouples and conductivity types.

As shown, the pushing of the block 26 of ink is achieved by a spring 30. Alternative means may be utilized such as, for example, a ratchet technique, a motor drive or even gravity feed. As also shown, the channel 38 supplies ink to the reservoir 40 through a capillary feed path. In the alternative, ink may be allowed to drip by gravity into the reservoir through the channel 38 as shown.

As also shown, the amount of ink in the block 26 is measured directly. In the alternative, the duration of the time for replenishing the reservoir 40 with ink 42 may be monitored. The system may be shut down if a predetermined time is exceeded.

In the system shown, blocks of ink 26 may replenish the same tube 28. In the alternative, the tube 28 and the block 26 may be removed as a cartridge and a new tube 28 and block 26 substituted.

Particular details of the imaging head 16 are disclosed in copending application Ser. No. 336,603, filed Jan. 4, 1982 now U.S. Pat. No. 4,459,601 and Ser. No. 576,582, filed Feb. 3, 1984 which are incorporated herein by reference.

Figure 3:
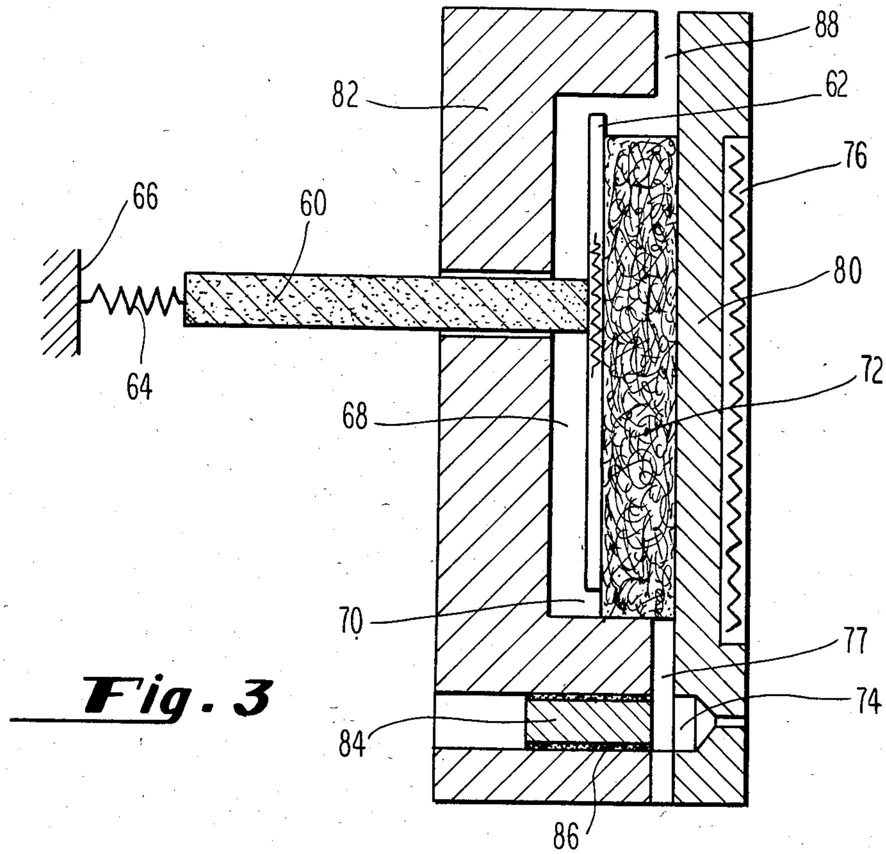
FIG. 3 is a sectional and partially schematic representation of another embodiment of the invention.

Reference will now be made to FIG. 3 wherein another embodiment of the invention is disclosed. A block or stick of ink 60 is pushed against a heated surface 62 under the influence of a spring 64 pushing against a surface 66. The consequence of contact with the surface 62, the ink of the block 60 is melted, flows down through a channel 68 to an opening 70, leading to a melt reservoir comprising a lattice or meshlike material 72 which may comprise polypropylene, polyurethane or an expanded metal lattice. By virtue of the interstices of the meshlike material 72, the melted ink is absorbed such that the meshlike material 72 serves as a melt reservoir of ink for ink jet chamber 74 which communicates with the melt reservoir through a restrictor 77.

As shown, the melt reservoir 72 as well as the surface 62 in contact with the block 60 are heated by a heater 76 at the face of a chamber plate 80. The rear of the apparatus comprises a plate 82 which includes an opening receiving the block 60 and another opening receiving a transducer 84 mounted in potting material 86. A vent 88 communicates with the channel 68.

It will be appreciated that the heater 76 only melts the end of the block 60 sequentially so as to permit ink to flow down through the channel 68 into the melt reservoir 72. The heater 76 also maintains the temperature of the melt reservoir 72 sufficiently high such that the ink is in a continuously melted state for supplying ink to the chamber 74.

Figure 4:
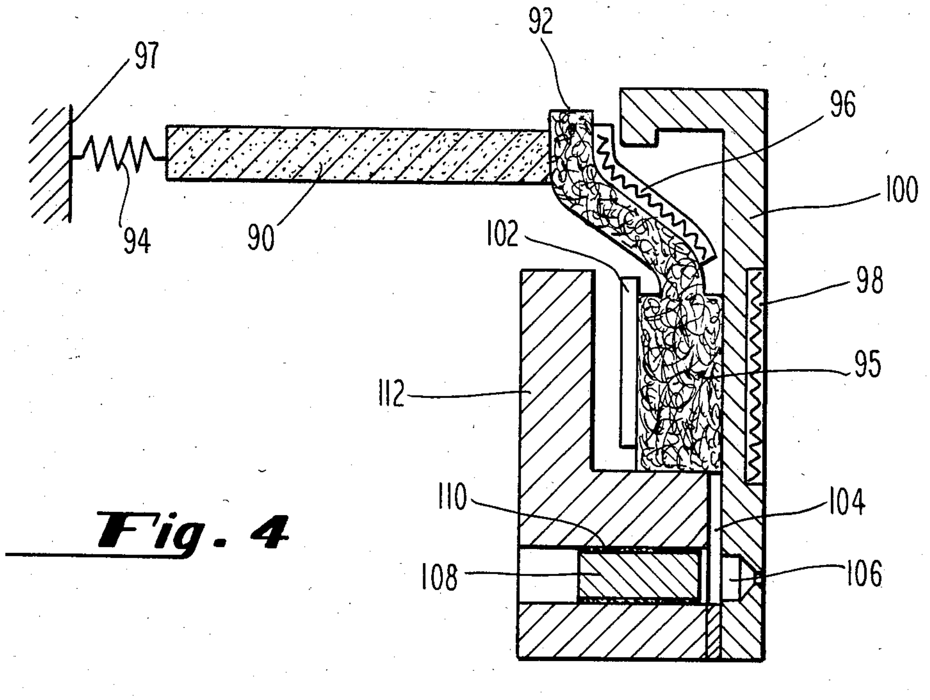
FIG. 4 is a sectional and partially schematic representation of still another embodiment of the invention.

Referring now to FIG. 4, the block of ink 90 is pushed against an ink guide 92 by a spring 94 pushing against a surface 97. The ink guide 92 as well as a melt reservoir 95 comprises a lattice or meshlike material. As shown in FIG. 4, separate heaters are utilized for the guide 92 and the reservoir 95. In particular, a guide heater 96 communicates with the guide 92 adjacent the block 90 while a reservoir heater 98 communicates with the reservoir 95. The melt reservoir 95 is located between the chamber plate 100 and a rear plate 102. Ink from the reservoir 95 in its melted state under the influence of the heater 98 is free to flow through a restrictor channel 104 to a chamber 106. The transducer 108 mounted in potting material 110 in an opening in a plate 112 is located behind the chamber 106.

In the embodiment of FIG. 4, as in the embodiment of FIG. 2, the use of separate heaters permits ink from the block to be melted on demand while at the same time maintaining ink in the reservoir in a liquid state ready for ejection from the ink jet. While not shown, it will be appreciated that level detection, timers and block detectors may be utilized with the embodiment of FIGS. 3 and 4 as shown in FIG. 2.

It will be appreciated that the reservoir 40 may include details disclosed in and copending application Ser. No. 661,925, filed Oct. 16, 1984, the head 16 may comprise elements disclosed in U.S. Pat. No. 4,459,601 and copending application Ser. No. 576,582, filed Feb. 3, 1984 and the ink may include that disclosed in U.S. Pat. No. 4,390,369 and pending U.S. applications Ser. No. 610,627, filed May 16, 1984, Ser. No. 565,124, filed Dec. 23, 1983 all of which are assigned to the assignee of this invention and incorporated herein by reference.

Although a particular embodiment of the invention has been shown and described and other alternatives suggested, it will be appreciated that other embodiments and alternatives will fall within the true spirit and scope of the invention as set forth in the appended claims.

I claim:

1. A method of operating an ink jet apparatus comprising at least one ink jet, ink in the solid state, and a reservoir for receiving melted ink; the method comprising the following steps:
   - sequentially heating to a melting point and cooling different portions of the solid state ink on demand while continuously heating the reservoir; and
   - coupling the melted ink to the reservoir.

2. The method of claim 1 including the step of advancing different portions of the solid state ink to juxtaposition with a heater.

3. The method of claim 1 including the step of controlling the duration of each sequential heating.

4. The method of claim 1 including the step of detecting the level of melted ink in the reservoir.

5. The method of claim 4 including the step of initiating and timing the duration of each sequential heating in response to detecting the level of melted ink in the reservoir.

6. The method of claim 1 including the step of detecting the supply of solid state ink in the solid state and inhibiting sequential heating in response to a low supply.

7. A method of supplying hot melt ink to an ink jet apparatus comprising the following steps:
   - heating a block of solid state ink on demand;
   - melting ink from the block in response to the heating;
   - heating a reservoir;
   - supplying the melted ink to a heated reservoir;
   - terminating the heating of the block of solid state ink;
   - continuing to heat the reservoir;
   - jetting the melted ink from the reservoir through at least one ink jet; and
   - repeating the aforesaid steps.

8. The method of claim 7 wherein heating comprises: advancing said block of ink to a heater area as the ink melts.

9. The method of claim 8 wherein said block of ink is advanced and maintained in proximity with a heater.

10. The method of claim 9 wherein said block is advanced by spring biasing.

11. The method of claim 7 including the step of detecting a low supply of ink in said reservoir before heating on demand.

12. The method of claim 7 wherein heating occurs for a predetermined length of time.

13. The method of claim 7 including the step of detecting a low supply of solid state ink so as to inhibit said heating.

14. The method of claim 7 including the step of moving said jets and said reservoir in unison in a scanning motion.

15. An ink jet apparatus comprising:

at least one ink jet;

a reservoir for supplying ink to said jet;

means for sequentially heating and cooling different portions of a block of ink in solid state form on demand to a melting point while continuously heating the reservoir; and means for coupling the melted ink to said reservoir.

16. The apparatus of claim 15 wherein said means for sequentially heating includes heater means and means for moving said solid state ink relative to said heater means.

17. The apparatus of claim 16 wherein said heater means comprises a plate.

18. The apparatus of claim 10 wherein said means for moving comprises spring means for biasing said block of ink against said heater means.

19. The apparatus of claim 15 including means for timing the duration of each said sequential heating.

20. The apparatus of claim 15 including means for detecting the level of melted ink in said reservoir.

21. The apparatus of claim 20 including means for initating and timing the duration of each said sequential heating in response to said means for detecting.

22. The apparatus of claim 15 including means for detecting the supply of said solid state ink and for inhibiting said means for sequentially heating.

23. The apparatus of claim 22 including means for scanning said means for sequentially heating, said reservoir and said jet in unison.

* * * * *